United States Patent [19]

Oehler

[11] 4,360,359
[45] Nov. 23, 1982

[54] METHOD FOR RELATING SHALLOW ELECTRICAL ANOMALIES TO THE PRESENCE OF DEEPER HYDROCARBON RESERVOIRS

[75] Inventor: Dorothy Z. Oehler, Ponca City, Okla.

[73] Assignee: Conoco Inc., Ponca City, Okla.

[21] Appl. No.: 243,235

[22] Filed: Mar. 13, 1981

[51] Int. Cl.$^3$ .................. G01N 31/12; G01N 33/24
[52] U.S. Cl. .................................. 436/28; 324/357;
436/31; 436/143; 436/149
[58] Field of Search .................. 324/357; 23/230 EP,
23/230.3; 166/252

[56] References Cited

FOREIGN PATENT DOCUMENTS 13068  7/1980  European Pat. Off ............. 324/357

OTHER PUBLICATIONS

Karstev et al., Geochemical Methods of Prospecting and Exploration for Petroleum and Natural Gas, 1959, pp. 246-249, TN 271P4K33.
Donovan–Petroleum Microseepage at Cement, Okla., Evidence and Mech., Am. Ass. of Pet. Geo. Bul. V58, No. 3, pp. 429-446.
Induced Polarization Responses Over Hydrocarbon Accum., Snyder et al., (I).
Exploration for Petroleum Using Complex Resistivity Measurements, Snyder et al., 11-16-1980, (II).

*Primary Examiner*—Michael S. Marcus

*Attorney, Agent, or Firm*—Cortlan R. Schupbach, Jr.

[57] ABSTRACT

A method is provided for evaluation of shallow electrical anomalies to determine which are likely to be caused by seepage from a hydrocarbon reservoir at depth. The method involves geochemical lithological, and petrographic analyses of anomalous sediments to determine whether these sediments contain certain features characteristic of seepage-induced anomalies. These features include the following:

(1) accumulations of seeped (non-indigenous) hydrocarbons;

(2) accumulations of carbonate cements that have $\delta^{13}C$ values between $-10$ and $-58°/oo$;

(3) pyrite accumulations in a shallow, porous host rock where the pyrite is distributed within fractures or between original grains with a disseminated or cement-like texture, and where it is not associated with kerogen or coal and is not framboidal in morphology;

(4) close proximity of said pyrite and carbonate accumulations; and (5) anomalous (high) induced polarization (I.P.) response in conjunction with high apparent resistivity where analyses show the sediments to be in anhydrite-poor formations; and high I.P. response in conjunction with low apparent resistivity where analyses show the sediments to be in anhydrite-rich formations.

24 Claims, No Drawings

METHOD FOR RELATING SHALLOW ELECTRICAL ANOMALIES TO THE PRESENCE OF DEEPER HYDROCARBON RESERVOIRS

This invention deals with a method for determining the presence of hydrocarbon reservoirs by mapping electrical anomalies in the near surface, then analyzing said anomalous sediments to determine whether such anomalies were actually caused by hydrocarbon seepage. Such anomalies are preferably detected by using electrical arrays which transmit current into the ground and receive the resulting complex voltages. From the magnitude of the received voltage, an apparent resistivity of the earth is calculated and from the phase of the received signal a measured phase is determined related to both anomalous, induced polarization in the earth and to electromagnetic coupling in the arrays. When well defined anomalies are present according to the method used for detecting said anomalies, said anomalies reflect a shallow electrical expression of geochemical characters that may or may not be due to seepage from a deeper hydrocarbon reservoir. The present invention deals with a method for evaluating such detected anomalies and determining which ones are actually caused by seeped remote hydrocarbons.

Introduction

It is now generally recognized that many hydrocarbon reservoirs leak and that small quantities of hydrocarbons from these reservoirs seep upwards to the near-surface. In the near-surface, the presence of seeped hydrocarbons in a porous host rock alters the chemistry of pore waters and promotes the growth of sulfate-reducing bacteria. These bacteria further alter the pore water chemistry by producing aqueous reduced sulfur species and bicarbonate ion. The interaction of the altered pore waters with the host rocks can result in anomalous concentrations of calcite, pyrite, elemental sulfur, magnetite, and uranium as well as in alterations in clays, siliceous cements, and spatial distributions of iron and manganese. The shallow accumulations of hydrocarbons and resultant mineralogical and porosity changes will correspond to geophysical anomalies which may be detectable by a variety of techniques. In particular, accumulations of carbonate cements, pyrite, other metallic minerals, and possible changes in clays alter the apparent resistivity and the measured phase as detected by induced polarization electrical measurements.

Gas anomalies in soils and surface samples over petroleum reservoirs have been noted, and shallow mineralogical and geophysical anomalies (attributed to effects of seepage) have been reported in specific localities (as detailed below). However, none of these isolated observations has been used to establish a method which allows determination of whether anomalies detected by electrical methods are formed as a result of seepage from a hydrocarbon reservoir at depth. In addition, none of the prior art has developed a model with which predictions can be made of hydrocarbon seepage-induced anomalies expected in different geologic settings.

It would therefore be of great benefit to provide a method for distinguishing hydrocarbon seepage-induced, geophysical or geochemical anomalies from those not related to hydrocarbon seepage. Such a method is provided by the present invention.

The present invention comprises a method for detecting subterranean hydrocarbon deposits comprising
(1) surveying by induced polarization earth formations to detect an anomaly, said anomaly caused by relatively high amounts of metallic sulfides,
(2) sampling said anomalous earth formations,
(3) analyzing said anomalous earth formations to determine whether they contain at least one of the following, certain characteristics of hydrocarbon seepage induced anomalies:
  (a) accumulations of seeped (non-indigenous) hydrocarbons;
  (b) accumulations of carbonate cements having $\delta^{13}C$ values between $-10°$ and $-58°/oo$. The anomaly is additionally defined where tests of the anomaly also show
  (c) a shallow, porous pyritic host rock, where the pyrite is distributed within fractures and/or between original grains with a disseminated or cement-like texture, where the pyrite is not spatially associated with kerogen or coal, on a microscopic scale, and where the pyrite is not framboidal;
  (d) close proximity between accumulations of said pyrite and said carbonate cements with respect to depth;
  (e) anomalous (high) induced polarization (I.P.) response in conjunction with high apparent resistivity, where analyses show the samples to be in anhydrite-poor formations; and
  (f) anomalous I.P. response in conjunction with low apparent resistivity where analyses show the samples to be in anhydrite-rich formations.

The invention is used in a preferred mode when the following method for evaluating electrical anomalies is used to determine whether said anomalies have been caused by hydrocarbon seepage:
(1) surveying by induced polarization earth formations to detect an anomaly, said anomaly caused by relatively high amounts of metallic sulfides,
(2) sampling said anomalous earth formations,
(3) sampling adjacent non-anomalous earth formations in an equivalent portion of the geologic section, and
(4) determining whether the anomaly is caused by seeped hydrocarbons from a subterranean deposit by comparing the sampled anomaly to samples of adjacent formations, wherein seeped hydrocarbon presence is confirmed when in comparison to adjacent formation samples, the sampled anomaly itself contains at least one characteristic selected from the group consisting of
  (a) relatively high concentrations of seeped hydrocarbons;
  (b) relatively high concentrations of carbonate cements that have $\delta^{13}C$ values between $-10$ and $-58$ parts per thousand and that may be enriched in manganese or iron along with relatively high ratios of organic matter (in kerogen or coal) plus ferrous iron (in clays, magnetite, or iron sulfides) to total iron.

Remote hydrocarbons can be determined by either of the two characteristics. The anomaly may be defined additionally where tests of the anomaly additionally show
  (c) relatively high concentrations of pyrite that occur within a shallow, porous host rock, where the pyrite is non-framboidal, is distributed within fractures or between original grains with a disseminated or cement-like texture, and is not spacially associated with kerogen or coal on a microscopic scale;

(d) close proximity between relatively high concentrations of said pyrite and relatively high concentrations of said carbonate cements;

(e) relatively high I.P. response in conjunction with relatively high apparent resistivity where analyses show the samples to be in anhydrite-poor formations; and (f) relatively high I.P. response in conjunction with relatively low apparent resistivity where analyses show the samples to be in anhydrite-rich formations.

The invention is used in a more preferred mode wherein an improved method of hydrocarbon exploration is used utilizing an electromagnetic method to investigate a polarizable stratum below the surface of the earth, said stratum being indicative of the presence of a hydrocarbon deposit lower than said stratum, by:

(a) implanting in electrical communication with said stratum spaced electrode means to generate a current which flows through paths at a depth in said stratum and to detect voltage resulting from the interception of these current flow paths;

(b) determining the characteristics of said generated current and corresponding detected voltage; and (c) utilizing said current and voltage characteristics to determine anomalies resulting from said stratum the improvement comprising evaluating the source of the anomaly to see if it is caused by seeped hydrocarbons from remote deposits, said hydrocarbon presence or effect of said hydrocarbon presence confirmed by analyzing the sampled anomaly and comparing it to adjacent, non-anomalous formations in equivalent portions of the geologic section, (when these are available) wherein the anomaly meets at least one of the criteria selected from the group consisting of (a) relatively high concentrations of seeped hydrocarbons;

(b) relatively high concentrations of carbonate cements that have $\delta^{13}C$ values between $-10$ and $-58$ parts per thousand and that may be enriched in manganese or iron along with relatively high ratios of organic matter (in kerogen or coal) plus ferrous iron (in clays, magnetite, or iron sulfides) to total iron.

(c) relatively high concentrations of pyrite that occur within a shallow, porous host rock, where the pyrite is non-framboidal, is distributed within fractures or between original grains with a disseminated or cement-like texture, and is not spacially associated with kerogen or coal on a microscopic scale;

(d) close proximity between relatively high concentrations of said pyrite and relatively high concentrations of said carbonate cements;

(e) relatively high I.P. response in conjunction with relatively high apparent resistivity where analyses show the samples to be in anhydrite-poor formations; and (f) relatively high I.P. response in conjunction with relatively low apparent resistivity where analyses show the samples to be in anhydrite-rich formations.

Prior Art

Major surface seeps of oil and gas have been recognized and used for many years in the search for petroleum deposits. If oily, these "macroseeps" generally consist of visible, tar-like hydrocarbon residues that have been oxidized and degraded by bacteria. Visible gas seeps are detected in offshore localities where gas bubbles move through the water column. Less obvious "microseeps", generally involving hydrocarbon gases in surface soils over petroleum accumulations, have been studied since the 1930's in Germany (Laubmeyer, *Petroleum* 29 (18): 1-4, 1933), the Soviet Union (Sokolov, *Neftyanoye Khoziaistvo* 27 (5): 28-34, 1935); (Stevens, *ABSTRACT, AAPG Bull.* 48: 549, 1964), and the U.S. (Rosaire, *Geophysics* 3: 96-115, 1938; Horvitz, *Unconventional Methods in Exploration for Petroleum and Natural Gas*, pp. 205-218, 1969). Horvitz has published numerous papers detailing methane, ethane, and propane anomalies over producing fields (Horvitz, 1969; Horvitz, *AAPG Bull.* 56 (5): 925-940, 1972; Horvitz, *ABSTRACT in Physical and Chemical Constraints on Petroleum Migration I*, 1978; Horvitz, *ABSTRACT, Symposium II, Unconventional Methods in Exploration for Petroleum and Natural Gas*, 1979; and Horvitz, *Problems of Petroleum Migration*, 1980). Interest in this area has increased recently, and extensive studies have been undertaken by various institutes in the Soviet Union (Fedynsky et al, *Proc. 9th World Petrol. Congress* 3: 279-288, 1975), the U.S. Department of Energy (Heemstra et al, *Bartlesville Energy Technology Center Report RI-78/18*, p. 84, 1978), Gulf Research and Development Company (Jones and Drozd, *AAPG Prog. & Abstracts*, pp. 194-195, 1979), and the Geosat-member companies/Jet Propulsion Laboratory Group. While most of this work is aimed at looking for hydrocarbon anomalies in soil samples, some airborne surveys are being conducted commercially (Thompson, *ABSTRACT, Symposium II, Unconventional Methods in Exploration for Petroleum and Natural Gas*, 1979), and some workers are now utilizing carbon isotope data in addition to gas concentration data to more effectively relate surface hydrocarbons to petroleum deposits at depth (Horvitz, 1978, 1979; Faber and Stahl, *AAPG Prog. & Abstracts*, p. 194, 1979; and Stahl et al, *AAPG Prog. & Abstracts*, p. 197, 1979).

One of the earliest reports of surface alteration associated with seepage from petroleum deposits is that by Moulton (*AAPG Bull.* 10: 304-311, 1926), in which he describes red bed bleaching. In this article, the mechanism proposed involves reduction of iron oxides by $H_2S$ presumed to occur with reservoired oil. More recently, the formation of calcite cements and elemental sulfur deposits in West Texas has been attributed to the action of sulfate-reducing bacteria on seeping hydrocarbons (Davis and Kirkland, *Econ. Geol.* 65: 107-121, 1970; Kirkland and Evans, *AAPG Bull.* 60 (11): 2005-2018, 1976). This interpretation is similar to that used by Freely and Kulp, (*AAPG Bull.* 41 (8): 1802-1853, 1957) to explain the association of calcite and elemental sulfur with trapped petroleum in caprocks of Gulf Coast salt domes. Pirson and Pirson (*U.S. Pat. No.* 3,943,436, 1976) have proposed that seeping hydrocarbons create a reducing environment within sediments and that this environment results in the generation of an electric fuel cell. They suggest that electric currents within the fuel cell, along with effects of hydrocarbon-clay interactions (also Gupta, *Ph.D. Dissertation, University of Texas, Aus-* tin, p. 121, 1972) and growth of sulfate-reducing bacteria, can account for uranium mineralization, elemental sulfur concentrations, and increased pore water salinity. Donovan and his colleagues have reported several geochemical anomalies in surface and near-surface sediments overlying hydrocarbon reservoirs (Donovan, *AAPG Bull.* 58 (3): 429-446, 1974; Donovan, *ABSTRACT*, Remote Sensing Conference, 1975; Donovan, Friedman, and Gleason, *Geology* (July): 351-354, 1974; Donovan and Noble, *ABSTRACT*, 1975; Donovan and Dalziel, *U.S. Dept. Interior, Geological Survey, Open-File Report* 77-817, p. 44, 1977; Henry and Donovan, *U.S. Dept. Interior, Geological Survey, Open-File Report* 78-927, p. 17, 1978; Donovan et al, *AAPG Bull.* 63 (2): 245-248, 1979). These anomalies include concentrations of magnetite (also Fedynsky, *Proc. 9th World Petrol. Congress* 3: 279-288, 1975) and manganese- and/or iron-enriched carbonate cements (with low $\delta^{13}C$ values) as well as redistributions of iron and manganese and concentrations of uranium (also Al-Shaieb et al, *AAPG Bull.* 61 (3): 360-375, 1977). Finally, Ferguson, in his master's thesis, (*Master's Thesis,* p. 95, 1977) has described accumulations of calcite, dolomite, pyrite, and elemental sulfur in sediments overlying three hydrocarbon fields in southern Oklahoma. These recent papers by Ferguson and by Donovan and others generally suggest that the shallow alterations can be attributed to hydrocarbon oxidation, seepage of $H_2S$, hydrocarbon-induced reducing conditions, and/or bacterial sulfate reduction.

Geophysical techniques used for detection of shallow anomalies potentially related to hydrocarbon seepage include induced polarization and resistivity measurements (Sternberg et al, patent application, U.S. Ser. No. 971,177, 1978); magneto-electric methods (Pirson and Pirson, U.S. Pat. No. 3,943,436, 1976); airborne magnetic and gamma-ray surveys (Donovan et al, *AAPG Bull.* 63, (2) 245-298, 1979), and analyses of aerial photographs and LANDSAT imagery (Donovan and Noble, *ABSTRACT* Remote Sensing Conference 1975; Halbouty, *AAPG Bull.* 60 (5): 745-793, 1976; Halbouty, *AAPG Bull.* 64 (1): 8-36, 1980; Donovan et al, *U.S. Dept. Interior, Geological Survey, Open-File Report No.* 79-243, p. 45, 1979). Sternberg et al (patent application, U.S. Ser. No. 971,177, 1978) have summarized the work of several commercial companies that are using shallow electrical measurements in petroleum exploration. Some geochemical methods are described in a recent article in *Oil & Gas Journal*, Dec. 1, 1980, page 194 (Duchscherer); however, in this article, these are not conceived of as methods for evaluating geophysical anomalies.

A preferred geophysical method for the detection of such anomalies is the INDEPTH method developed by CONOCO Inc. and described in patent application United States Ser. No. 971,177 filed Dec. 20, 1978, hereby incorporated by reference in its entirety into the present specification.

Background

It is believed that the method of the present invention is effective because of certain reactions which occur in shallow formations which contact seeping hydrocarbons. However, it should be clear that the following discussion is in part theoretical in nature and I do not wish my invention defined thereby.

Many reservoir caprocks are imperfect seals and will allow the leakage of small quantities of hydrocarbons. These hydrocarbons will seep upwards, primarily due to their buoyancy and to their movement in solution with upward moving subsurface waters. Seeping hydrocarbons tend to migrate vertically (due to vertically-directed buoyant forces) but may also move along paths of relatively low resistance through open faults or up-dip through carrier beds. Seepage to the near-surface will be enhanced if there is some gas in the reservoir, since gaseous hydrocarbons will readily seep because of their high buoyancies, small molecular sizes, and relatively high solubilities in water. Seepage also occurs if there are open faults or fractures that extend from the reservoir to the near-surface, or at least extend through any relatively tight, impermeable strata that exist between the reservoir and the near-surface. Seepage will be retarded if unfaulted, very tight, and highly impermeable strata (such as some deep, thick evaporites or highly compacted shales) occur in the column or rock overlying the reservoir.

In environments where seepage has reached near-surface, the specific mineralogical anomalies formed will depend on the presence and lithology of suitable host rocks. Host rocks may be of any lithology that can accomodate some of the seeping materials. However, since seeping hydrocarbons will accumulate to the greatest extent in shallow porous rocks that are capped by less permeable sediments and that are not within a zone of active, oxygen-charged weathering, these host rocks are where the formation of seepage-induced anomalies is the most pronounced. Within these host rocks, the presence of hydrocarbons alters the chemistry of the pore waters. Pore waters in shallow, porous sediments are commonly aerobic (oxidizing); that is, they contain free or dissolved oxygen. In the presence of seeping or accumulated hydrocarbons, oxygen is removed by physical stripping and by utilization in chemical or aerobic bacterial oxidation of the hydrocarbons. As a result, the Eh (oxidation potential) of the pore waters is lowered and the pore waters become anaerobic (reducing). The change from aerobic to anaerobic conditions promotes the growth of anaerobic, sulfate-reducing bacteria, and the metabolic products of these organisms (reduced sulfur species and bicarbonate) additionally lower the pore water Eh and are responsible for the shallow accumulations of pyrite, other sulfides, elemental sulfur, and much of the carbonate related to petroleum reservoirs at depth.

In their metabolism, the sulfate-reducing bacteria reduce the $S^{+6}$ in dissolved sulfate ion ($SO_4^{-2}$) to $S^{-2}$ in the dissolved species $S^{-2}$, $HS^-$, and $H_2S$. These species are highly reactive and will combine with available iron to form iron sulfide (FeS) precipitates. These iron sulfides are unstable and rapidly convert to pyrite and/or marcasite (both polymorphs of $FeS_2$) which are the main sources of induced polarization (measured phase) anomalies. Conversion can occur within periods as short as several years. Pyrite can form directly, at low temperatures, under conditions that are undersaturated for the iron sulfide, greigite ($Fe_3S_4$), but that are saturated for pyrite.

Pyrite formed as a result of hydrocarbon seepage into a shallow, porous host rock tends to be disseminated or cement-like, occurring between original grains and in fractures. Such pyrite will not be framboidal (occurring in spheroidal crystal clusters) and will not be spatially associated (in close physical proximity) with kerogen or coal on a microscopic scale. In contrast, early diagenetic pyrite in organic-rich sediments (such as shales, marls, coals) tends to be framboidal and spatially associated with kerogen or coal.

Iron present in iron oxide is a good source of available iron for reaction with the reduced sulfur species. Other relatively insoluble sulfides, such as spalerite (ZnS), galena, (PbS), chalcopyrite ($CuFeS_2$), arsenopyrite (FeAsS), or molybdenite ($MoS_2$) form if significant quantities of the appropriate minor or trace elements are available in the pore waters or in the host rocks. In situations where iron or other sulfide mineral-forming elements are lacking or are present only in low concentrations, excess $HS^-$, $H_2S$, or $S^=$ will migrate until they come into contact with oxygen in aerobic waters, where they will be oxidized to elemental, native sulfur ($S°$) or back to sulfate ion ($SO_4^{-2}$).

For the bacterial reduction of sulfate, organic carbon is required as the reducing agent, and as a result of this process, the organic carbon (potentially the seeping hydrocarbons) is oxidized, primarily to bicarbonate ion ($HCO_3^-$); this bicarbonate enhances the precipitation of carbonate (primarily calcite) by reaction with dissolved calcium ion ($Ca^{+2}$) in the pore water. Thus, the seeped hydrocarbons are oxidized in two stages, first, in the initially oxidizing pore waters by chemical and aerobic bacterial processes and later, in the anaerobic pore waters by sulfate-reducing bacteria. Calcite, dolomite, or siderite cements can result from both of these stages of oxidation.

Diffusional processes, governed by vertical concentration gradients of calcium ion, the reduced mobile ferrous ion, bicarbonate ion, and sulfate ion, can lead to the formation of relatively narrow, horizontal layers of pyrite and calcite. The formation of layers or disseminated pyrite in host rocks affected by hydrocarbon seepage will alter the spatial distribution of iron such that the iron will be concentrated in the pyritic zone and depleted from nearby zones of the host rock. This process will convert relatively homogenous iron distributions to more heterogeneous distributions. Iron can be redistributed by conditions that favor the reduction of ferric ($Fe^{+3}$) ion in the insoluble, redcolored, iron oxides to the more soluble, ferrous ($Fe^{+2}$) ion. These conditions involve low pH, low Eh, and low concentrations of dissolved carbonate and sulfur. In this situation, excess ferric ion is reduced to the soluble ferrous form, which then migrates in solution until a higher Eh environment is encountered. This reduction and local removal of iron through mobilization results in the "bleaching" of red beds (iron oxide-rich sandstones). When the soluble iron is concentrated by pore water flow and is reoxidized at one locality back to the ferric form, exceptionally dense accumulations of the red or yellow iron oxides are produced.

Although pyrite and marcasite are the stable species in many anaerobic, low Eh waters, various combinations of Ph, Eh, and dissolved carbonate and sulfur concentrations can place a local pore water within the stability field of magnetite ($Fe_3O_3$) or siderite ($FeCO_3$). Manganese carbonate ($MnCO_3$) can form under conditions of low Eh and high dissolved carbonate concentrations and therefore can be accumulated in zones of maximum carbonate cementation. In trace amounts, $Mn^{+2}$ (the reduced species of manganese) can be adsorbed onto calcite surfaces and both $Mn^{+2}$ and $Fe^{+2}$ (reduced species) can be adsorbed onto dolomite surfaces. $Mn^{+2}$ and $Fe^{+2}$ also can substitute within dolomite or calcite lattices. Because of these relationships, zones of carbonate formation resulting from seepage-induced diagenesis may have comparatively high concentrations of manganese or iron. Finally, the low Eh of the anomalous sediments also can favor precipitation of uranium minerals in seepage-affected zones.

Anomalies in Different Geologic Settings

Since shallow relatively fresh pore waters typically carry only trace amounts of iron in solution, pyrite formation (the main source of induced polarization anomalies) will be restricted to host rocks containing available iron for reaction with reduced sulfur species. Iron oxides are good sources of iron for this type of pyrite formation. Sandstones, shales, and claystones typically contain much more available iron than do carbonates or anhydrites. For example, "average" sandstone contains about 1.7 percent $Fe_2O_3$, which is three times the amount of $Fe_2O_3$ reported from "average" limestone and several thousand times greater than the amount of iron reported from some marine carbonates. Thus, hydrocarbon seepage-induced pyrite accumulations will be most significant in clastic, sandy host rocks. Red beds, because of their relatively high iron oxide content, are potentially the best host rocks for formation of large quantities of hydrocarbon seepage-derived pyrite and for the occurrence of measurable, hydrocarbon seepage-induced changes in the spatial distribution of iron. In carbonate host rocks, the amount of seepage-induced pyrite will be limited in general and will be a fraction of that likely to form in average clastic hosts. In these carbonate hosts, excess reduced sulfur species eventually are oxidized to elemental sulfur.

Calcite cements will form in both carbonate and clastic host rocks as a result of hydrocarbon seepage. In anhydrite-poor sediments, this calcite will plug porosity, producing fairly tight, impermeable horizons with resultant high apparent resistivity. In anhydrite- (or gypsum-) bearing host rocks, the bacterial sulfate reduction process will enhance dissolution of the anhydride (or gypsum) by removing the sulfate ion from pore waters. This dissolution will be accompanied by calcite precipitation (due to hydrocarbon oxidation), and thus the calcite cements may actually replace the anhydrite or gypsum. This conversion involves a 20 percent decrease in rock volume and, depending on the amount of pyrite formed by the reduced sulfur species and the mineralogy of the iron source, this decrease in rock volume will result in increased porosity and resultant decreased apparent resistivity in zones of seepage-induced calcite precipitation.

In evaporitic (anhydrite - or gypsum-bearing) host rocks, the dissolution of anhydrite or gypsum will provide abundant sources of dissolved sulfate ion for bacterial reduction of $H_2S$, $HS^-$, and $S^=$. If bacterial growth is not limited by low concentrations of metabolizable seeped hydrocarbons, then very large quantities of $H_2S$, $HS^-$, and $S^=$ will be produced in these types of settings. Since evaporitic sediments are commonly poor in iron, very large quantities of elemental sulfur are eventually formed from oxidation of the reduced sulfur species in nearby aerobic localities.

Since sulfate-reducing bacteria require dissolved sulfate ion in order to produce the reduced sulfur species, the sulfate ion content of the host rock pore water is another variable to be considered. However, most pore waters contain some sulfate ion, and this variable is usually not a limiting factor except where pore waters are extremely fresh. In these cases, some carbonate cements may form, but pyrite will not occur unless reservoired $H_2S$ has migrated into the host rock along with the seeping hydrocarbons.

Thus the major geophysical anomalies that will correspond to seepage-induced chemical or geological anomalies can be defined. In many clastic hosts (which are ironbearing and anhydrite-poor), high IP response (measured phase anomaly) from pyrite will correspond to high apparent resistivity from the porosity plugging cements which are formed along with pyrite. In many carbonate hosts, the phase anomalies will be of relatively low magnitude since pyrite formation is limited by the small quantities of available iron. If the carbonates are anhydrite-poor, phase anomalies in these hosts will correspond to apparent resistivity highs. However, if the carbonates are associated with anhydrite or gypsum, (as in evaporitic settings), phase anomalies will correspond to apparent resistivity lows from the increased porosity resulting when calcite replaces anhydrite. In iron-free hosts (many carbonates, evaporites, and some clastics), pyrite will not form and significant phase anomalies will not occur or will be of very low magnitude.

Method for Evaluating Shallow Anomalies

Since the occurrence of shallow electrical anomalies over deeper hydrocarbon reservoirs is a result of hydrocarbon seepage-induced geochemical alterations in a shallow host rock, shallow anomalies can be linked most directly to the presence of a reservoir at depth by correlation with anomalously high concentrations of hydrocarbons in the host rock (concentrations which are significantly higher than could be expected to be generated by indigenous organic material, such as kerogen or coal). Porous, shallow host rocks generally contain low concentrations of indigenous hydrocarbons, as this type of original, organic material is frequently oxidized in the high-energy, depositional environments of sandstones and/or by very early diagenetic action of oxidizing groundwaters common to these shallow, porous units. In addition, even in good petroleum source rocks at maturity for peak hydrocarbon generation, the amount of hydrocarbons generated is relatively low compared to the total organic carbon content.

Thus, seeped gas can be identified from analyses of canned samples, where headspace plus cuttings gas data show (a) $C_1$ to $C_4$ hydrocarbon concentrations greater than 1,000 ppm, when the total organic carbon (TOC) content of the rock is less than 0.1% by weight;
(b) $C_1$ to $C_4$ hydrocarbon concentrations greater than 10,000 ppm, when the TOC is less than 0.2%; or
(c) $C_1$ to $C_4$ hydrocarbon concentration greater than 100,000 ppm, when the TOC is less than 0.3%; or generally where
(d) Concentration $C_1$ to $C_4$ hydrocarbons in ppm exceeds $10(2+10 \text{ (TOC in \%)})$.

In addition, seeped gases can be distinguished from shallow accumulations of gas produced by methane bacteria ("marsh gas") by compound distributions and $\delta^{13}C$ values, as determined by the relationship $$\delta^{13}C \text{ sample} = \frac{{}^{13}C/{}^{12}C \text{ sample} - {}^{13}C/{}^{12}C \text{ standard}}{{}^{13}C/{}^{12}C \text{ standard}} \times 1000,$$

where all $\delta^{13}C$ values are reported in parts per thousand (0/00) with reference to the PDB (Peedee Belemnite) limestone standard. Positive $\delta^{13}C$ values indicate that the sample is enriched in the heavier isotope, $^{13}C$ compared to the standard; negative $\delta^{13}C$ values indicate that the sample is enriched in the lighter isotope, $^{12}C$, compared to the standard. Marsh gas typically contains more than 99% methane, where the methane has a $\delta^{13}C$ value in the range of $-90°$ to $-60°/oo$. In contrast, seeped gas from petroleum reservoirs commonly contains proportionately less methane (and more ethane and propane) and a $\delta^{13}C$ value in the range of $-58°$ to $-30°/oo$.

Seeped oil (anomalous concentrations of the heavier hydrocarbons) is indicated when analyses of ground powders show the following characteristics:

(a) (HC)/(OC) greater than 20, where HC equals the $C_{15}$ and heavier hydrocarbon content in ppm and OC equals the percent toal organic carbon content multiplied by 100;
(b) (HC)/(OC) between 2 and 20, when the indigenous organic carbon (kerogen) is gas-prone, either by being woody or coaly in type or by being overmature (vitrinite reflectance % $R_o$ greater than 1.5, and kerogen alteration index greater than 3+) or when the kerogen is immature (% $R_o$ less than 0.4 and kerogen alteration index less than 2);
(c) seeped oils are additionally indicated when samples, pyrolyzed using a temperature-programmed pyrolysis instrument and a flame ionization detector, show a ratio of peak one to peak two that is greater than 1, using the procedure described by Clements (AAPG Bulletin 63/12: 2227-2232, 1979).

Seeped oil is indicated also by characteristics in gas data derived from headspace and cuttings gases of canned samples where:

$$\frac{C_5 \text{ to } C_7 \text{ hydrocarbon concentration}}{C_1 \text{ to } C_4 \text{ hydrocarbon concentration}} \text{ is} \qquad (a)$$

is greater than 0.5, or $$\frac{C_2 \text{ to } C_4 \text{ hydrocarbon concentration}}{C_1 \text{ hydrocarbon concentration}} \text{ is greater than 1.}$$

is greater than 1. Finally, seeped hydrocarbons (either gaseous or oily) are indicated when hydrocarbon concentrations are greatest in horizons with greatest porosity, as these are the strata in which seeping materials will accumulate. These strata commonly have the lowest concentrations of total organic carbon.

Since the small amounts of indigenous hydrocarbons that occur within shallow porous host rocks are likely to be relatively tightly adsorbed to kerogen or mineral surfaces compared to seeped hydrocarbons (that will be present within relatively large pore spaces), seeped materials can be preferentially concentrated by collection and analysis of 1) gases that diffuse rapidly into the headspace of canned samples or 2) the oily hydrocarbons from extracts of unground samples (grinding the samples, as is usually done, will release indigenous as well as seeped oils). All of the above characteristics apply also to hydrocarbons concentrated in this manner. When the anomalous sediments are compared with adjacent, non-anomalous sediments, differences in concentrations of seeped hydrocarbons will be observed more readily using these methods to selectively concentrate the seeped materials or using methods to collect soil gases. It is likely that gas concentrations from the headspace of canned core will be lower than concentrations from the headspace of canned cuttings of the same sample. To adjust for this difference, canned cores should be allowed to stand for a few days to a few weeks before analysis for headspace gas, whereas canned cuttings can be analyzed immediately after collection.

When most seeped hydrocarbons have been oxidized or have diffused out of the porous host rock, high concentrations of carbonate cements can provide evidence of past hydrocarbon seepage. Since the carbon in these cements derives at least in part from oxidized hydrocarbons, it will have a $\delta^{13}C$ value between that of seeping petroleum (generally in the range of $-22°/oo$ to $-58°/oo$) and that more typical of marine and freshwater carbonates not derived from hydrocarbon oxidation (in the range of $+5°/oo$ to $-10°/oo$). Thus, seepage-related carbonate cements will have $\delta^{13}C$ values between about $-10°/oo$ and $-58°/oo$. Within this $\delta^{13}C$ range, as the values become more negative, they will be more distinctive of shallow carbonate cements that have formed as a result of hydrocarbon seepage. These carbonates also may be enriched in manganese and iron and may be associated with zones where uranium and cement-like or disseminated pyrite have accumulated.

Pyrite and uranium occurrences are indicators of reducing environments, and since shallow porous host rocks typically contain little indigenous organic matter (that could serve as a reducing agent), these shallow accumulations of pyrite and uranium can be indirect indicators of the introduction of reducing materials through a process of seepage. However, further evidence that reduced, pyritic zones or zones of carbonate cementation have been produced by seepage, rather than by indigenous organic materials, can be provided by comparison of the organic matter+ferrous iron to total iron ratio is reduced and non-reduced regions of the host rock. In areas where seepage has not occurred, but where local reduced zones have been produced by indigenous organic matter, iron reduction (to form pyrite) will be accompanied by oxidation of the indigenous organic matter, and the amount of reduced iron formed will be balanced by the amount of indigenous organic matter lost (by oxidation). Thus, this ratio will be similar in both the reduced and non-reduced regions of the host rock. In contrast, in areas of seepage, the amount of reduced (ferrous) iron formed (in clays, magnetite, or iron sulfides) will be balanced by the amount of seeped materials oxidized, and the indigenous organic matter will not necessarily be diminished. Thus, in areas of seepage, this ratio will be higher in the reduced (pyrite-bearing) zones than it is in equivalent, non-reduced strata.

In the literature, there has been much discussion of the occurrence of geochemical "halos" in surface and near-surface sediments over petroleum reservoirs. In these halos, anomalous conditions occur only over the margins of hydrocarbon accumulations and non-anomalous conditions occur in apical positions and in laterally distant areas beyond the halos. Geochemical halos are most frequently reported for helium, for uranium-sourced gamma radiation, and for hydrocarbon gases sampled from soils.

Hydrocarbon gas halos occur when gas preferentially seeps upwards from the reservoir margins. This appears due in part to dissolved gas migration with the upward-moving margin waters, but it can also be a consequence of the blockage of vertical migration routes by apical cementation of the reservoir seal or of any rock unit between the reservoir and the surface. This type of cementation can result from porosity-plugging carbonate formation due to membrane filtration of upward moving pore waters or hydrocarbon oxidation involving either the reservoired petroleum or seeped hydrocarbons in host rocks above the reservoir. Thus, hydrocarbon seepage from many reservoirs can begin vertically (giving rise to apical gas, carbonate, pyrite and resultant electrical anomalies), but with time and carbonate cementation of the reservoir seal or shallow host rocks, vertical migration pathways can be largely blocked; seepage then occurs mainly at the edges of the reservoir. Continuation of these processes, with increased hydrocarbon saturation of the reservoir, diverts the flow of subsurface waters to the reservoir periphery where sediment pore systems remain water-wet. This type of peripheral water flow then adds to the shallow gas halos by moving some of the lighter hydrocarbons in solution. At shallow depths, with lower pressures and temperatures, these dissolved gases tend to exsolve and form a separate gas phase. As this marginal seepage eventually results in the formation of marginal carbonate cements, the diameter of the surface gas halo becomes larger with time. This type of cementation can be responsible also for uranium and helium halos.

If this type of cementation process is a major factor in the production of halo gas anomalies over some reservoirs, then in these cases, the full area of occurrence seepage-induced electrical (phase and apparent resistivity) anomalies might correspond to high concentrations of carbonate cements (with $\delta^{13}C$ values between $-10°$ and $-58°/oo$), whereas high concentrations of seeped gaseous hydrocarbons would only be found at the geographic periphery of the mapped electrical anomaly.

Analytical data from shallow cores from Ashland Field in southeastern Oklahoma are included in the following example to illustrate the use of this invention in evaluating an electrical anomaly caused by hydrocarbon seepage.

EXAMPLE

Analyses of two shallow (300-foot deep) cores (one "on-field" and one "off-field") from Ashland Field in southeastern Oklahoma were obtained from late 1978 until the spring of 1980. A lithological correlation of the cores was made as were geochemical and petrographic evaluations and porosity determinations. Results show that (1) Methane from the 3,500-foot-deep Hartshorne reservoir seeped vertically and accumulated in porous host rocks ranging in depth from about 15 to 70 feet. The seeped gas was identified by its relatively high concentration in the headspace gas of on-field canned core samples and by its $\delta^{13}C$ value of $-42.5°/oo$ and compound distributions (which resemble the $\delta^{13}C$ value and compound distributions of gas collected from the reservoir). In the on-field well, highest concentration of this gas were found in the most porous, organic-poor strata; in these strata; $C_1$ to $C_4$ hydrocarbon concentrations ranged from about 2000 to 23,500 ppm and total organic carbon concentrations ranged from 0.07 to 0.2%. The equivalent zone in the off-field well was not enriched in the light gases as compared to other less porous or more organic-rich zones in the off-field well. In this equivalent off-field zone, $C_1$ to $C_4$ hydrocarbon concentrations (about 200 to 1000 ppm) were only a fraction of those measured in the on-field well, whereas the total organic carbon concentrations (about 0.07 to 0.2%) and the porosity were similar.

(2) Within these same porous host rocks in the on-field core, pyrite concentrations were determined quantitatively by the American Society of Testing Materials method, and calcite concentrations were determined by LECO acid digestion methods. The pyrite was disseminated, non-framboidal, and cement-like. Calcite from these zones had $\delta^{13}C$ values ranging from $-22°/oo$ to $-27°/oo$. These calcites plugged porosity. Pyritic zones occurred in close proximity to calcite-cemented zones. IP anomalies correlated with pyrite-enriched zones and resistivity highs correlated best with calcite-cemented zones.

(3) Water analyses indicated that sulfate and calcium ions were preferentially depleted in formation waters from the on-field core hole (presumably from seepage-enhanced bacterial sulfate reduction and calcite precipitation, respectively).

(4) Elemental analyses using a tube excited fluorescense analyzer of homogenized rock powders indicated that, in the on-field core, sulfur and calcium had been added to the host rock and that iron and manganese had been mobilized and redistributed only with the host rock; iron had been concentrated within the narrow pyrite-rich zones and manganese was concentrated in zones with the carbonate cements. Iron from deeper, relatively tight claystones had not been mobilized and redistributed and had not reacted with any reduced sulfur to form an iron sulfide precipitate.

(5) Ratios of organic matter plus reduced iron to total iron were higher in the on-field core in the zones of pyrite accumulation and carbonate precipitation than in equivalent zones in the off-field core.

(6) Gamma-ray spectroscopy of homogenized rock powders showed that uranium is concentrated in the on-field core in the zone of maximum pyrite enrichment.

A comparative example illustrates the use of the present invention in identifying an electrical anomaly not related to hydrocarbon seepage and which does not indicate the presence of a deeper hydrocarbon reservoir. In this case, analyses of the anomalous sediments are negative for (1.) concentrations of seeped hydrocarbons,
(2.) concentrations of carbonate cements with $\delta^{13}C$ values more negative than $-10°/oo$, and
(3.) concentrations of non-framboidal pyrite that is distributed between original grains or within fractures of a porous host rock and that is not spatially associated with kerogen or coal on a microscopic scale.

Rather, analyses of this anomaly show
1. concentrations of framboidal pyrite or other metallics that are in close proximity to kerogen or coal, and a correspondence of high I.P. with low resistivity where analyses show the anomaly to be in an anhydrite-poor formation; or
2. concentrations of high cation exchange capacity minerals in a formation having a geographic distribution that is coincident with that of the electrical anomaly.

In addition, if non-anomalous sediments are available from the equivalent portion of the geologic section, comparative analyses of these non-anomalous sediments will show either 1. a reduced content of kerogen or coal and a corresponding reduced content of framboidal pyrite, or
2. a major change in lithology such that the equivalent anomalous formation is not present.

Thus, the characteristics described in the present invention have been shown to be useful in evaluating electrical anomalies to determine which are related to hydrocarbon seepage and the presence of a hydrocarbon reservoir at depth.

While certain embodiments and details have been shown for the purpose of illustrating this invention, it will be apparent to those skilled in this art that various changes and modifications may be made herein without departing from the spirit or scope of the invention.

I claim:

1. A method for detecting subterranean hydrocarbon deposits comprising:
   (a) surveying earth formations by induced polarization to detect an electrical anomaly,
   (b) sampling said anomalous earth formations
   (c) analyzing said anomalous earth formations to determine whether said anomalous earth formation contains metallic sulfides which are not spacially associated with kerogen or coal, and when said anomalous earth formations contain metallic sulfides that are not associated with kerogen or coal, thereafter,
   (d) analyzing said anomalous earth formations to determine whether the anomaly is caused by seeped hydrocarbons, hydrocarbon-induced anomalies indicated by
      (1) accumulations of seeped gases as determined by $C_1$ to $C_4$ hydrocarbon concentration in ppm exceeding $_{10}(2+10$ (TOC in %)), where TOC=total organic carbon concentration and where methane has a $\delta^{13}C$ value between $-58°$ and $-30°/oo$;
      (2) accumulations of seeped oils where ground sample analyses show
         (a) (HC)/(OC) ratios greater than 20, where HC=$C_{15}$ and heavier hydrocarbon concentrations in ppm and OC=percent total organic carbon multiplied by 100; or
         (b) (HC)/(OC) ratios between 2 and 20, where indigenous organic carbon is gas-prone; or
         (c) Peak I/Peak II ratios, determined by temperature-programmed pyrolysis greater than 1, and-/or
      (3) accumulations of seeped oils where data from headspace plus cuttings gases of canned samples show $$\frac{C_5 \text{ to } C_7 \text{ hydrocarbon concentrations}}{C_1 \text{ to } C_4 \text{ hydrocarbon concentrations}}$$

greater than 0.5 or $$\frac{C_2 \text{ to } C_4 \text{ hydrocarbon concentrations}}{C_1 \text{ hydrocarbon concentrations}}$$

greater than 1, where the indigenous organic carbon is dry gas-prone.

2. A method as described in claim 1 wherein after any positive indication of hydrocarbon-induced anomalies, hydrocarbon presence is further indicated when the anomalous earth formation in addition has (a) anomalous (high) induced polarization (I.P.) response in conjunction with high apparent resistivity, where analyses show the samples to be in anhydrite-poor formations; or (b) anomalous I.P. response in conjunction with low apparent resistivity where analyses show the samples to be in anhydrite-rich formations.

3. A method for detecting subterranean hydrocarbon deposits comprising:

(a) surveying earth formations by induced polarization to detect an anomaly, (b) sampling said anomalous earth formations (c) sampling adjacent non-anomalous earth formations from equivalent portions of the geologic section, (d) analyzing and comparing said anomalous and non-anomalous earth formations to determine whether the anomalous earth formations contain higher concentrations of metallic sulfides not associated with kerogen or coal than the non-anomalous earth formation and where said anomalous earth formations contain higher concentrations of such sulfides, thereafter, (e) determining whether the anomaly is caused by seeped hydrocarbons by comparing the sampled anomalous earth formation to the sampled non-anomalous adjacent formations, wherein seeped hydrocarbon presence or effect is confirmed when in comparison to adjacent earth formation samples the sampled anomalous earth formation itself contains higher (1) accumulations of seeped gases, as determined by $C_1$ to $C_4$ hydrocarbon concentration in ppm exceeding $_{10}(2+10 \,(TOC \,in \,\%))$, where TOC= total organic carbon concentration and where methane has $\delta^{13}C$ value between $-58°$ and $-30°/oo$;

(2) accumulations of seeped oils, as determined by ground sample analyses showing (a) (HC)/(OC) ratios greater than 20, where HC=$C_{15}$ heavier hydrocarbon concentrations in ppm and OC=percent total organic carbon multiplied by 100; or (b) (HC)/(OC) ratios between 2 and 20, where indigenous organic carbon is gas-prone; or (c) Peak I/Peak II ratios, determined by temperature-programmed pyrolysis, greater than 1, (3) accumulations of seeped oils as determined by data from headspace plus cuttings gases of canned samples showing $$\frac{C_5 \text{ to } C_7 \text{ hydrocarbon concentrations}}{C_1 \text{ to } C_4 \text{ hydrocarbon concentrations}}$$

greater than 0.5 or $$\frac{C_2 \text{ to } C_4 \text{ hydrocarbon concentrations}}{C_1 \text{ hydrocarbon concentrations}}$$

greater than 1, where the indigenous organic carbon is dry gas-prone.

4. A method described in claim 3 wherein, after any positive indication of a hydrocarbon-induced anomaly, hydrocarbon presence is further indicated when in comparison to non-anomalous earth formation the anomalous earth formation in addition has (a) relatively high apparent resistivity readings in conjunction with anhydrite-poor formations; or (b) relatively low apparent resistivity readings in conjunction with anhydrite-rich formations.

5. A method as described in claim 3 wherein, after positive indication of a hydrocarbon-induced anomaly, hydrocarbon presence is further indicated when, in comparison to the non-anomalous earth formation, the anomalous earth formation in addition contains relatively high concentrations of uranium, total sulfur, or calcium.

6. A method described in claim 3 wherein after positive indication of a hydrocarbon-induced anomaly, hydrocarbon presence is further indicated when, in comparison to the non-anomalous earth formation, the anomalous earth formation in addition contains relatively heterogeneous distributions of iron and manganese.

7. A method as described in claim 3 wherein, after positive indication of a hydrocarbon-induced anomaly, hydrocarbon presence is further indicated when, in comparison to the non-anomalous earth formation, the anomalous earth formation in addition contains pore waters with relatively low $SO_4^=/Cl^-$ ion ratios.

8. An improved method of hydrocarbon exploration utilizing an electromagnetic method to investigate a polarizable stratum below the surface of the earth, said stratum being indicative of the presence of a hydrocarbon deposit lower than said stratum, by:

(a) implanting in electrical communication with said stratum spaced electrode means to generate a current which flows through paths at a depth in said stratum and to detect voltage resulting from the interception of these current flow paths;

(b) determining the characteristics of said generated current and corresponding detected voltage; and (c) utilizing said current and voltage characteristics to determine anomalies resulting from said stratum, the improvement comprising evaluating the source of the anomalies to see if they are caused by seeped hydrocarbons from remote deposits, said hydrocarbon presence or effect of said hydrocarbon presence indicated by (1) sampling said anomalous earth formation to determine whether said formation contains metallic sulfides not associated with kerogen or coal, and when said anomalous earth formations contain metallic sulfides not associated with kerogen or coal, thereafter (2) analyzing said anomalous earth formations to determine whether the anomaly is caused by seeped hydrocarbon effect, hydrocarbon-induced anomalies indicated by comparing the sampled anomalous earth formations to surrounding non-anomalous earth formations, wherein the anomalous earth formation contains higher:

(1) accumulations of seeped gas, as determined by $C_1$ to $C_4$ hydrocarbon concentration in ppm exceeding $_{10}(2+10 \,(TOC \,in \,\%))$, where TOC=total organic carbon concentration and where methane has a $\delta^{13}C$ value between $-58°$ and $-30°/oo$;

(2) accumulations of seeped oils, as determined by ground sample analyses showing (a) (HC)/(OC) ratios greater than 20, where HC=$C_{15}$ and heavier hydrocarbon concentrations in ppm and OC=percent total organic carbon multiplied by 100; or
(b) (HC)/(OC) ratios between 2 and 20, where indigenous organic carbon is gas-prone; or
(c) Peak I/Peak II ratios, determined by temperature-programmed pyrolysis, greater than 1,
(3) accumulations of seeped oils as determined by data from headspace plus cuttings gases of canned samples showing $$\frac{C_5 \text{ to } C_7 \text{ hydrocarbon concentrations}}{C_1 \text{ to } C_4 \text{ hydrocarbon concentrations}}$$

greater than 0.5 or $$\frac{C_2 \text{ to } C_4 \text{ hydrocarbon concentrations}}{C_1 \text{ hydrocarbon concentrations}}$$

greater than 1, where the indigenous organic carbon is dry gas-prone.

9. A method as described in claim 8 wherein, after positive indication of a hydrocarbon-induced anomaly, hydrocarbon presence is further indicated when, in comparison to the non-anomalous earth formation, the anomalous earth formation has
(a) relatively high apparent resistivity readings in conjunction with anhydrite-poor formation; or
(b) relatively low apparent resistivity readings in conjunction with anhydrite-rich formations.

10. A method as described in claim 8 wherein, after positive indication of a hydrocarbon-induced anomaly, hydrocarbon presence is further indicated when, in comparison to the non-anomalous earth formation, the anomalous earth formation in addition contains relatively high concentrations of uranium, total sulfur, or calcium.

11. A method as described in claim 8 wherein, after positive indication of a hydrocarbon-induced anomaly, hydrocarbon presence is further indicated when, in comparison to the non-anomalous earth formation, the anomalous earth formation in addition contains relatively heterogeneous distributions of iron and manganese.

12. A method as described in claim 8 wherein, after positive indication of a hydrocarbon-induced anomaly, hydrocarbon presence is further indicated when, in comparison to the non-anomalous earth formation, the anomalous earth formation in addition contains pore waters with relatively low $SO_4^=/Cl^-$ ratios.

13. A method for detecting subterranean hydrocarbon deposits comprising:
(a) surveying earth formations by induced polarization to detect an electrical anomaly,
(b) sampling said anomalous earth formations
(c) analyzing said anomalous earth formations to determine whether said anomalous earth formation contains metallic sulfides which are not spacially associated with kerogen or coal, and when said anomalous earth formations contain metallic sulfides that are not associated with kerogen or coal, thereafter,
(d) analyzing said anomalous earth formations to determine whether the anomaly is caused by seeped hydrocarbons, hydrocarbon-induced anomalies indicated by accumulations of carbonate cements having $\delta^{13}C$ values between $-10°$ and $-58°$/oo.

14. A method as described in claim 13 wherein said metallic sulfides are in close vertical proximity to said accumulations of carbonate cements.

15. A method for detecting subterranean hydrocarbon deposits comprising:
(a) surveying earth formations by induced polarization to detect an anomaly,
(b) sampling said anomalous earth formations
(c) sampling adjacent non-anomalous earth formations,
(d) analyzing and comparing said anomalous and non-anomalous earth formations to determine whether the anomalous earth formations contain higher concentrations of metallic sulfides not associated with kerogen or coal than the non-anomalous earth formation and where said anomalous earth formations contain higher concentrations of such sulfides, thereafter,
(e) determining whether the anomaly is caused by seeped hydrocarbons by comparing the sampled anomalous earth formation to be sampled non-anomalous adjacent formations, wherein seeped hydrocarbon presence or effect is confirmed when in comparison to adjacent earth formation samples the sampled anomalous earth formation itself contains higher accumulations of carbonate cements having $\delta^{13}C$ values between $-10°$ and $-58°$/oo.

16. A method described in claim 15, wherein, after positive indication of a hydrocarbon-induced anomaly, hydrocarbon presence is further indicated when in comparison to non-anomalous earth formation the anomalous earth formation in addition has
(a) relatively high apparent resistivity readings in conjunction with anhydrite-poor formations; or
(b) relatively low apparent resistivity readings in conjunction with anhydrite-rich formations.

17. A method as described in claim 15 wherein, after positive indication of a hydrocarbon-induced anomaly, hydrocarbon presence is further indicated when, in comparison to the non-anomalous earth formation, the anomalous earth formation in addition contains relatively high concentrations of uranium, total sulfur, or calcium.

18. A method as described in claim 15 wherein, after positive indication of a hydrocarbon-induced anomaly, hydrocarbon presence is further indicated when, in comparison to the non-anomalous earth formation, the anomalous earth formation in addition contains relatively heterogeneous distributions of iron and manganese.

19. A method as described in claim 15 wherein, after positive indication of a hydrocarbon-induced anomaly, hydrocarbon presence is further indicated when, in comparison to the non-anomalous earth formation, the anomalous earth formation in addition contains pore waters with relatively low $SO_4^=/Cl^-$ ion ratios.

20. An improved method of hydrocarbon exploration utilizing an electromagnetic method to investigate a polarizable stratum below the surface of the earth, said stratum being indicative of the presence of a hydrocarbon deposit lower than said stratum, by:
(a) implanting in electrical communication with said stratum spaced electrode means to generate a current which flows through paths at a depth in said stratum and to detect voltage resulting from the interception of these current flow paths;

(b) determining the characteristics of said generated current and corresponding detected voltage; and (c) utilizing said current and voltage characteristics to determine anomalies resulting from said stratum, the improvement comprising evaluating the source of the anomalies to see if they are caused by seeped hydrocarbons from remote deposits, said hydrocarbon presence or effect of said hydrocarbon presence indicated by (1) sampling said anomalous earth formation to determine whether said formation contains metallic sulfides not associated with kerogen or coal, and when said anomalous earth formations contain metallic sulfides not associated with kerogen or coal, thereafter (2) analyzing said anomalous earth formations to determine whether the anomaly is caused by seeped hydrocarbon effect, hydrocarbon-induced anomalies indicated by comparing the sampled anomalous earth formations to surrounding non-anomalous earth formations, wherein the anomalous earth formation contains higher accumulation of carbonate cements having $\delta^{13}C$ values between $-10°$ and $-58°/oo$.

21. A method as described in claim 20 wherein, after positive indication of a hydrocarbon-induced anomaly, hydrocarbon presence is further indicated when, in comparison to the non-anomalous earth formation, the anomalous earth formation has (a) relatively high apparent resistivity readings in conjunction with anhydrite-poor formation; or (b) relatively low apparent resistivity readings in conjunction with anhydrite-rich formations.

22. A method as described in claim 20 wherein, after positive indication of a hydrocarbon-induced anomaly, hydrocarbon presence is further indicated when, in comparison to the non-anomalous earth formation, the anomalous earth formation in addition contains relatively high concentrations of uranium, total sulfur, or calcium.

23. A method as described in claim 20 wherein, after positive indication of a hydrocarbon-induced anomaly, hydrocarbon presence is further indicated when, in comparison to the non-anomalous earth formation, the anomalous earth formation in addition contains relatively heterogeneous distributions of iron and manganese.

24. A method as described in claim 20 wherein, after positive indication of a hydrocarbon-induced anomaly, hydrocarbon presence is further indicated when, in comparison to the non-anomalous earth formation, the anomalous earth formation in addition contains pore waters with relatively low $SO_4^=/Cl^-$ ratios.

* * * * *